(12) United States Patent
Chessman et al.

(10) Patent No.: US 6,967,814 B1
(45) Date of Patent: Nov. 22, 2005

(54) SPRING DISK CLAMP UTILIZING WEDGED RETAINING RING

(75) Inventors: Herbert Ross Chessman, Erie, CO (US); Paul D. Mischo, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 272 days.

(21) Appl. No.: 10/626,812

(22) Filed: Jul. 23, 2003

Related U.S. Application Data

(62) Division of application No. 09/905,385, filed on Jul. 12, 2001, now Pat. No. 6,624,968.

(60) Provisional application No. 60/217,995, filed on Jul. 13, 2000.

(51) Int. Cl.[7] .............................................. G11B 17/028
(52) U.S. Cl. ................................ 360/99.12; 360/98.08
(58) Field of Search ......................... 360/99.12, 98.08, 360/99

(56) References Cited

U.S. PATENT DOCUMENTS

| 5,270,999 | A |  | 12/1993 | Chessman et al. ........... 369/290 |
| 5,274,517 | A |  | 12/1993 | Chen ........................ 360/98.08 |
| 5,333,080 | A |  | 7/1994 | Ridinger et al. ........... 360/99.12 |
| 5,528,434 | A |  | 6/1996 | Bronshvatch et al. ..... 360/98.08 |
| 5,548,457 | A |  | 8/1996 | Brooks et al. ............ 360/98.08 |
| 5,555,144 | A |  | 9/1996 | Wood et al. .............. 360/98.08 |
| 5,731,928 | A |  | 3/1998 | Jabbari et al. ........... 360/98.08 |
| 5,790,345 | A |  | 8/1998 | Alt .......................... 360/98.08 |
| 5,940,244 | A | * | 8/1999 | Canlas et al. ............ 360/98.08 |
| 6,172,844 | B1 | * | 1/2001 | Luo et al. ................ 360/98.08 |
| 6,462,902 | B1 | * | 10/2002 | Luo et al. ................ 360/99.12 |
| 6,550,328 | B1 | * | 4/2003 | Horning et al. .......... 360/99.12 |
| 6,563,668 | B1 | * | 5/2003 | Suwito .................... 360/98.08 |
| 6,816,338 | B1 | * | 11/2004 | Suwito .................... 360/99.12 |

\* cited by examiner

*Primary Examiner*—Robert S. Tupper
(74) *Attorney, Agent, or Firm*—Sheridan Ross P.C.

(57) ABSTRACT

A spring disk clamp is provided for securing one or more data storage disks to a disk drive without the need for screws. The disk clamp incorporates an angled surface defining the central opening of the clamp which is positioned adjacent a sloping surface of the hub. An external axial load applied to the clamp deflects the clamp, and allows a retaining member to be wedged between the clamp and the hub. Stabilizing features such as O-rings and the like are also eliminated as the clamp of the invention provides both radial and axial stabilization to the disk pack in its mounting to the hub.

15 Claims, 2 Drawing Sheets

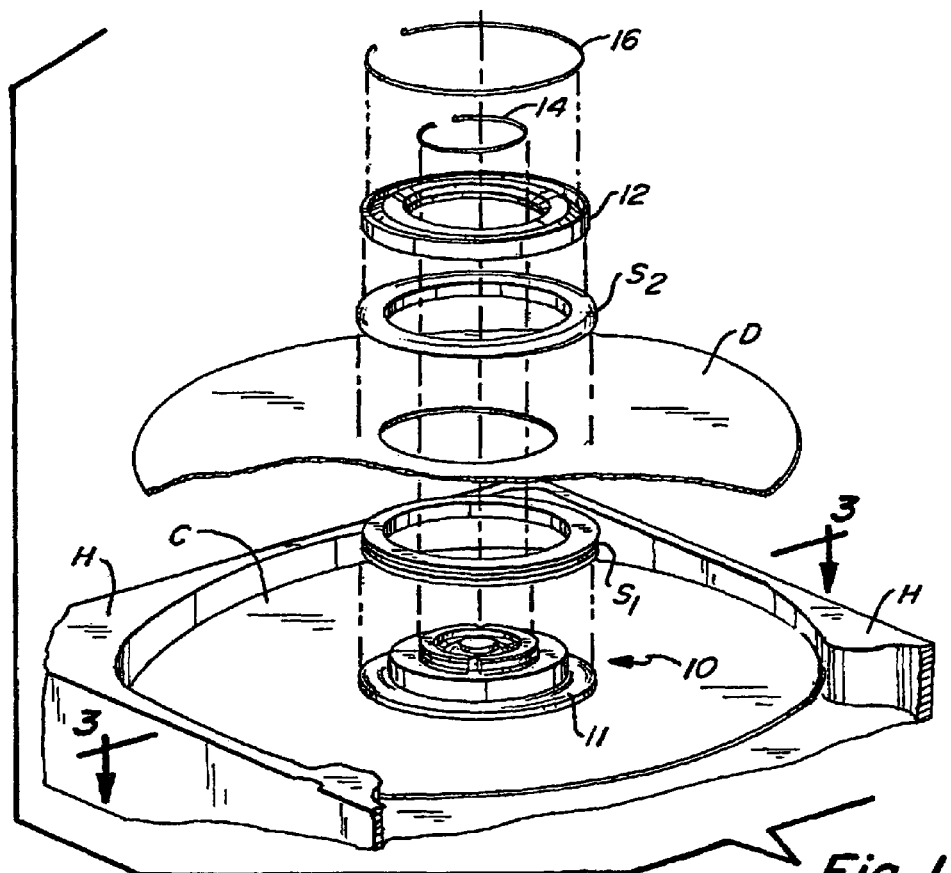
Fig_1
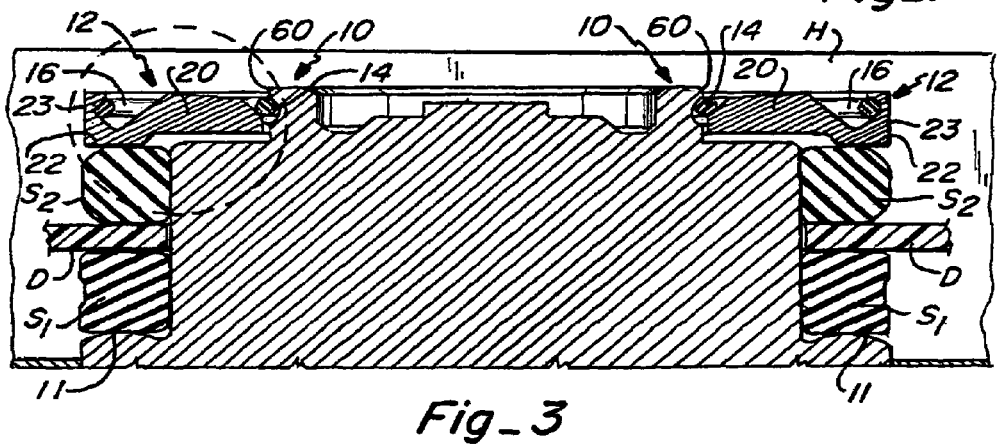
Fig_3

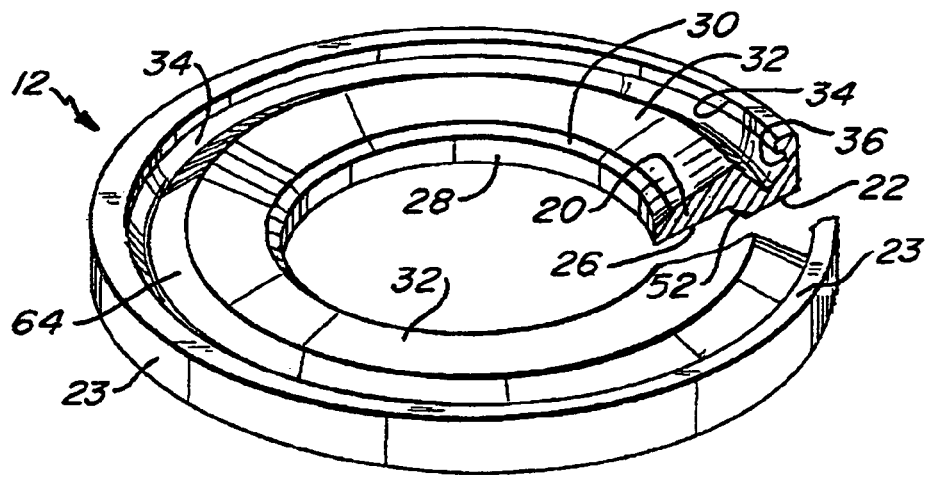
Fig_2
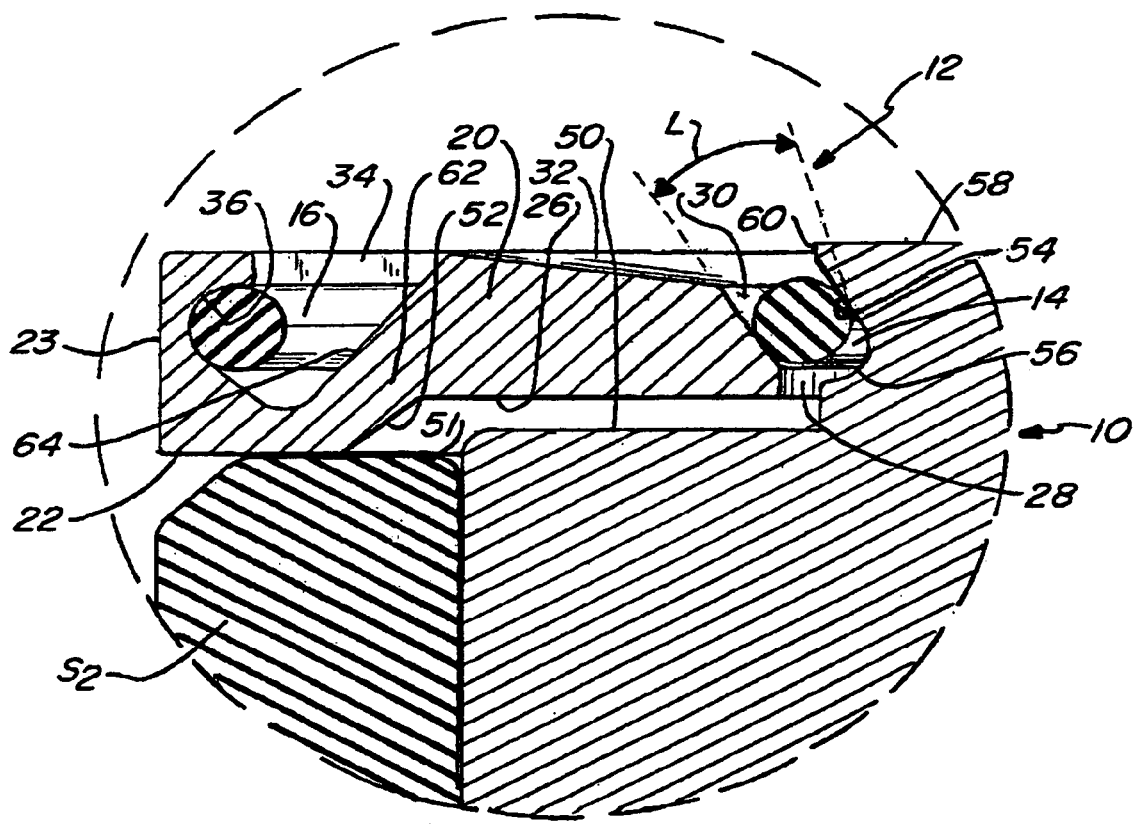
Fig_4

SPRING DISK CLAMP UTILIZING WEDGED RETAINING RING

CROSS REFERENCE TO RELATED APPLICATIONS

The present application is a divisional application of and claims priority from U.S. patent application Ser. No. 09/905,385, filed Jul. 12, 2001 now U.S. Pat. No. 6,624,968, entitled "SPRING DISK CLAMP UTILIZING WEDGED RETAINING RING", the entire disclosure of which is incorporated herein by this reference.

Priority is claimed from U.S. Provisional Patent Application No. 60/217,995 filed on Jul. 13, 2000, and entitled "SPRING DISK CLAMP UTILIZING WEDGED RETAINING RING" and further identified as the disclosure of which is incorporated herein by reference in its entirety.

FIELD OF THE INVENTION

This invention relates to disk drive systems, and more particularly, to an apparatus and method of securing one or more data storage disks to a hub of a spindle motor used in a disk drive.

BACKGROUND OF THE INVENTION

Disk drive data storage systems typically include one or more data storage disks mounted to a spindle hub, and a spindle motor drives the spindle hub which rotates the disks at high RPMs. A disk clamp assembly secures the disks to the hub.

Data disks have a central bore or opening that receives the spindle hub. A common type of disk clamp assembly includes an annular or disk-shaped disk clamp, and a number of screws that secure the clamp to the hub. One or more disks positioned below the clamp are secured to the hub. In addition, spacers may be placed on both sides of each disk. For example, in a disk drive with a single data disk, the arrangement could include in series, a clamp, a spacer adjacent the clamp, a disk, a spacer on the opposite side of the disk, and then the hub. For some disk clamp assemblies, a top data disk may directly contact the disk clamp without the use of a spacer. The disks and spacers are often referred to as a disk pack.

Examples of references disclosing clamps utilizing securing screws include the U.S. Pat. Nos. 5,274,517; 5,333,080, 5,528,434, and 5,790,345.

Certain disadvantages arise by using screws to secure the clamp to the hub. One distinct disadvantage is that the screws transmit uneven and irregular radially and axially directed forces to the data disk, thus resulting in surface irregularities on the disk. Any distortion or surface irregularities of the disk read/write surface may result in poor head transducer flight characteristics. Another disadvantage is that use of screws contributes to disk contamination. Particle generation occurs when the screws are driven for attaching the clamp.

Another type of disk clamp exists which does not require the use of screws to secure the clamp to the hub. Presumably, these types of clamps help to reduce undesirable radial or axial loading and also help to reduce contamination. One example of a clamping device which does not require the use of screws to secure a clamp to the hub includes the device disclosed in the U.S. Pat. No. 5,270,999. The disk clamp disclosed in this references has a flat lower surface which directly contacts the data disk. The central opening of the clamp includes an inner conical surface. The upper end of the hub includes a groove having a complementary conical surface. When the clamp is mounted over the hub, a uniform circumferential gap exists between the conical surfaces. A clip or spring is placed in the gap between the conical surfaces. When the spring is in place, the clamp resists axial force that may act to disengage the disk from the hub. In addition to the clip or spring, an O-ring is also used to stabilize the disk with respect to the hub. The clamp disclosed in the '999 patent provides very little axial force to secure the disk or disks to the hub. Thus, the O-ring must be used to help prevent radial movement of the disk with respect to the hub. There is always some small gap between the inner edge of the disk defining the central opening and the outer surface of the hub. This gap can allow radial movement of the disk with respect to the hub if no force is provided to prevent such radial movement.

While the foregoing references may be adequate for their intended purposes, the clamp of the present invention further simplifies the overall disk clamp and hub arrangement, thus minimizing the cost of fabrication and assembly, reducing the likelihood of malfunction in the disk drive system, and providing effective and consistent performance.

SUMMARY OF THE INVENTION

In accordance with the preferred embodiment of the present invention, an apparatus in the form of a disk clamp, and a method for securing one or more data storage disks to a hub of a disk drive is provided. The disk clamp eliminates the need for using screws to secure the clamp to the hub. In use, the clamp provides an axial force upon the disk pack which prevents the disk(s) from both axial and radial displacement with respect to the hub. The axial force keeps the disk or disks from slipping relative to the hub during rotation, and during events such as high shock loads impacting the disk drive. The disk clamp is deflected by an external axial load, and then a retaining member such as a wire ring or multiple sections of wire arcs are inserted between an angled surface defining the central opening of the clamp and a corresponding sloping surface defining a concentric groove formed on the hub. Since screws are not used to set the clamp, uneven loads causing undesirable radial and axial forces upon the disk or disks are eliminated, thus reducing disk distortion in the direction of read/write flight. Furthermore, O-rings or other stabilizing structures are not required to stabilize the connection between the disk and the hub because of the axial force which is provided by the clamp.

The disk clamp includes a lower peripheral flange which contacts the underlying spacer or disk. When the external axial load is applied to set the clamp, the disk clamp itself acts as a spring in that it deflects downward in response to the applied axial load. After the retaining member is placed in the gap between the groove on the hub and the angled surface of the clamp, the axial load is removed which enables the disk clamp to spring back to its undeflected state; however, the retaining member prevents full return resulting in the retaining member being wedged between the clamp and the hub. A peripheral groove may be formed on the upper surface of the clamp for receiving a balance ring. The balance ring is sized and positioned to spin balance the disk pack.

Additional advantages will become apparent from a review of the below-described drawings, taken in conjunction with the detailed description.

BRIEF DESCRIPTION OF THE DRAWINGS

FIG. 1 is an exploded perspective view of a hub and disk assembly of a disk drive, including the disk clamp of the present invention;

FIG. 2 is an enlarged fragmentary perspective view of the disk clamp;

FIG. 3 is a vertical section illustrating the manner in which the clamp secures the disk and associated spacers; and FIG. 4 is a greatly enlarged section of FIG. 3.

DETAILED DESCRIPTION OF THE DRAWINGS

Referring now to the drawings and specifically to FIG. 1, a disk drive includes a housing H, a chamber C formed in the housing for receiving one or more data disks D including one or more corresponding spacers S. FIG. 1 illustrates a single disk D disposed between a pair of spacers S. If no upper spacer were used, the disk clamp would directly contact the disk D. However, it shall be understood that the clamp of the present invention is usable with single or multiple data disks D depending upon the configuration the disk pack.

Now also referring to FIG. 3, when the disk drive is assembled, the lower spacer $S_1$ rests upon a flange 11 of the hub 10. The disk D rests on the lower spacer $S_1$, and an upper spacer $S_2$ is placed on top of the disk D. The spring disk clamp 12 contacts the upper surface of the upper spacer $S_2$. If an upper spacer is not used, the disk clamp would directly contact the disk D. When an external axial load is applied to the clamp 12, retaining ring 14 is inserted into the gap between the concentric groove formed on the upper extension 15 of the hub 10 and the inner surface defining the central opening of the clamp 12, as further discussed below. A balance ring 16 is inserted within a peripheral groove 34 formed on the upper surface of the clamp 12.

Now referring to FIG. 2, the specific construction of the spring clamp 12 is best seen. Clamp 12 includes an annular body portion 20. A lower peripheral flange 22 is integral with the body portion 20 and extends radially outward and downward from the lower surface 26 of the clamp 12. The lower peripheral flange 22 terminates at the external peripheral edge 23 of the clamp. The peripheral flange 22 is illustrated as having a flat lower surface; however, as desired, the lower surface of the peripheral flange can be modified to include either a flat or rounded shape. The central opening of the clamp 12 is defined by an inner perpendicular edge 28, and a chamfered or conical angled surface 30. As shown, the most upper portion of the angled surface 30 communicates with the upper surface 32 of the clamp. Finally, the clamp 12 includes the upper concentric groove 34 formed on the upper surface thereof. Groove 34 is located adjacent the peripheral edge 23. An arcuate-shaped pocket 36 of the groove 34 receives the balance ring 16 therein.

Now referring to FIGS. 3 and 4, the spindle hub 10 includes an annular surface 50 which is provided at a height so that a definable gap exists between it and the lower surface 26 of the clamp 12. Because the peripheral flange 22 does not completely cover the upper surface 51 of the upper spacer $S_2$, the gap extends to the most inner concentric portion 52 of the flange 22.

The upper extension 15 of the hub 10 includes the circumferential groove formed thereon. This groove is defined by one or more shaped surfaces and specifically includes sloping surface 54 and adjacent arcuate surface 56. The sloping surface 54 communicates with a planar annular upper surface 58 of the hub extension 15. The sloping surface 54 and upper surface 58 can be described as forming an annular lip or flange 60.

Once the disk clamp 12 is placed over the hub 10, the axial load is applied on upper surface 32 to set the clamp. In response to the axial loading, the annular body portion 20 deflects downward, thus increasing the gap between surfaces 30 and 54, and narrowing the gap between lower surface 26 and upper surface 50. The clamp primary deflects along the concentric narrowed portion 62 defined between the concentric portion 52 and the inner edge 64 of the groove 34. Therefore, this narrowed portion 62 provides a means for allowing the clamp to deflect in response to a load. When the clamp is deflected, the retaining ring 14 can be positioned between sloping surface 54 and angled surface 30. When the axial load is released, the clamp springs back to achieve its undeflected state; however, the retaining ring 14 prevents full return resulting in the retaining member being wedged between the clamp and the hub. The retaining ring 14 can be sized to accommodate the desired magnitude of the securing force applied for securing the disk pack. Use of a retaining ring 14 having a larger cross sectional area would result in a greater permanent force being applied to the disk pack by the clamp. Preferably, the clamp and hub are constructed so that surfaces 30 and 54 are parallel to one another, as shown in FIG. 4, or a positive angle L is defined between the surfaces. The positive angle L between surface 30 and surface 54 is preferably between 0° (parallel) and 15°. A negative angle between the surfaces makes installation of the retaining ring 14 more difficult, while an angle greater than 15° may result in undesirable slippage of the retaining ring.

Because of the variable force which may be applied by the clamp to the disk pack, the clamp is well suited for many disk drive applications. Whether a disk drive includes one or multiple disks, the clamp of this invention eliminates not only the need to use securing screws, but also eliminates the need to use O-rings or other stabilizing features normally required to prevent radial displacement of the disks with respect to the hub. Contamination is reduced as well because screws are not used to set the clamp.

While the above description and drawings disclose and illustrate a preferred embodiment, this invention is not limited to this specific embodiment. Those skilled in the art to which the invention pertains may make other modifications employing the principles of this invention, particularly upon considering the foregoing disclosure. Therefore, by the appended claims, the applicant intends to cover any modifications and any other embodiments which incorporate the features which constitute essential features of the invention.

What is claimed is:

1. An assembly for securing one or more disks to a hub of a disk drive, said assembly comprising:

a spindle hub having a circumferential groove formed thereon, said groove being defined by at least one sloping surface;

a disk clamp mounted over said spindle hub, said disk clamp including a central opening defined by at least one angled surface which lies adjacent said at least one sloping surface when said disk clamp is mounted over said spindle hub, said disk clamp further including a lower surface, an upper surface, a peripheral flange integral with said disk clamp and extending radially outward and downward from said lower surface, and a circumferential groove formed on said upper surface; and a retaining member inserted in a gap between said at least one sloping surface and said at least one angled surface.

2. An assembly, as claimed in claim 1, further including:
a balance ring mounted in said circumferential groove.

3. An assembly, as claimed in claim 1, wherein:
said retaining member includes a plurality of arc sections selectively spaced from one another in said gap.

4. An assembly for securing one or more disks to a hub of a disk drive, said assembly comprising:
a spindle hub having a circumferential groove formed thereon, said groove being defined by at least one sloping surface;
a disk clamp mounted over said spindle hub, said disk clamp including a central opening defined by at least one angled surface which lies adjacent to said at least one sloping surface when said disk clamp is mounted over said spindle hub, said disk clamp further having an annular body portion including upper and lower surfaces, a peripheral edge, means spaced radially inward from said peripheral edge for allowing said annular body portion to deflect in response to an axial load placed on said annular body portion, and a circumferential groove formed on said upper surface; and
a retaining member inserted in a gap between said at least one sloping surface and said at least one angled surface.

5. An assembly, as claimed in claim 4, further including:
a balance ring mounted in said circumferential groove.

6. A method of securing one or more data disks to a hub of a disk drive, said method comprising the steps of:
providing a disk clamp having a peripheral flange, and a central opening defined by at least one angled surface;
providing a spindle hub having a circumferential groove formed thereon, said circumferential groove being defined by at least one sloping surface;
mounting the clamp over the hub so that said angled surface of said clamp lies adjacent said sloping surface of said hub;
applying an axial load to said disk clamp;
deflecting said disk clamp in response to said axial load causing said angled surface to displace away from said sloping surface;
inserting a retaining member between said angled surface and said sloping surface; and
releasing the axial load resulting in said angled surface moving back toward said sloping surface thereby wedging said retaining member between said angled surface and said sloping surface.

7. A method, as claimed in claim 6, wherein:
said angled surface and said sloping surface extend substantially parallel to one another.

8. A method, as claimed in claim 6, wherein:
said angled surface and said sloping surface extend at an angle to one another between about zero degrees and fifteen degrees.

9. A method, as claimed in claim 6, wherein:
the retaining member is of a desired cross-sectional area prior to said inserting step to selectively adjust an amount of force supplied by the disk clamp to secure the one or more data disks.

10. An assembly, as claimed in claim 4, wherein:
said retaining member includes a plurality of arc sections selectively spaced from one another in said gap.

11. A method of securing one or more data disks to a hub of a disk drive without the use of securing screws, said method comprising the steps of:
providing a disk clamp of unitary construction without screw holes, and a central opening defined by at least an angled surface, said disk clamp further including a lower peripheral flange extending radially outward and downward from said disk clamp;
providing a spindle hub having a circumferential groove formed thereon;
mounting the clamp over the hub;
applying an axial load to the disk clamp;
deflecting the disk clamp in response to the axial load;
inserting a retaining member in a gap between the angled surface and the circumferential groove;
releasing the axial load resulting in partial return of the disk clamp from its deflected state thereby wedging the retaining member between the disk clamp and the hub.

12. A method, as claimed in claim 11, wherein:
said circumferential groove of the spindle hub is defined by at least one sloping surface, wherein said release of the axial load results in said angled surface moving back towards said sloping surface thereby wedging the retaining member between the angled surface and the sloping surface.

13. A method, as claimed in claim 12, wherein:
said angled surface and said sloping surface extend substantially parallel to one another.

14. A method, as claimed in claim 12, wherein:
said angled surface and said sloping surface extend at an angle to one another between about 0° and 15°.

15. A method, as claimed in claim 11, further including the step of:
providing the retaining member of a desired cross-sectional area prior to said inserting step to selectively adjust a magnitude of force sup plied by the disk clamp to secure the one or more data disks.

* * * * *